United States Patent [19]

Dubos et al.

[11] 4,321,072

[45] Mar. 23, 1982

[54] METHOD FOR AUTOMATIC CENTERING OF AN OPTICAL FIBER WITHIN A PRIMARY PROTECTIVE CLADDING AND A DEVICE EMPLOYED FOR CARRYING OUT SAID METHOD

[75] Inventors: Jacques Dubos; Michel Faure; Yves Lumineau, all of Paris, France

[73] Assignee: Lignes Télégraphiques et Téléphoniques, Conflans Ste Honorine, France

[21] Appl. No.: 206,830

[22] Filed: Nov. 14, 1980

[30] Foreign Application Priority Data

Nov. 16, 1979 [FR] France ................................ 79 28307

[51] Int. Cl.³ .......................... C03C 25/02; G01B 9/02
[52] U.S. Cl. ...................................... 65/3.11; 65/3.13; 65/10.1; 65/29; 65/160; 118/672; 118/680; 356/73.1; 427/10
[58] Field of Search ................... 118/672, 680; 427/10; 356/73.1; 65/2, 3.11, 10.1, 3.13, 29, 160

[56] References Cited

U.S. PATENT DOCUMENTS

| | | | |
|---|---|---|---|
| 3,652,243 | 3/1972 | Jensen | 65/2 |
| 3,800,388 | 4/1974 | Borner | 356/73.1 X |
| 4,042,723 | 8/1977 | Presby | 427/10 X |
| 4,046,536 | 9/1977 | Smithgall | 65/2 |
| 4,124,728 | 11/1978 | Marcuse | 427/10 X |

FOREIGN PATENT DOCUMENTS 2704140  8/1978  Fed. Rep. of Germany .

*Primary Examiner*—Robert L. Lindsay, Jr.
*Attorney, Agent, or Firm*—Oblon, Fisher, Spivak, McClelland & Maier

[57] ABSTRACT

Highly accurate centering of an optical fiber within a primary cladding deposited by a coating device is carried out by automatic regulation during the fiber-drawing process in order to optimize the mechanical properties of the fiber. The position of the coating device is controlled in dependence on the position of the fiber with respect to an origin of coordinates (O) determined by optoelectronic means. The frusto-conical lower end of the coating die is maintained at each instant by electronic and electromechanical means at the point (O') located at this level on the straight-line segment (OR) which joins the origin to the first point of contact of the fiber with the pulley used for guiding the fiber towards a storage drum.

5 Claims, 3 Drawing Figures

METHOD FOR AUTOMATIC CENTERING OF AN OPTICAL FIBER WITHIN A PRIMARY PROTECTIVE CLADDING AND A DEVICE EMPLOYED FOR CARRYING OUT SAID METHOD

This invention relates to a method for automatic centering of an optical fiber within a primary protective cladding and also to the device employed for carrying out said method.

It is already known that, during the actual process of drawing an optical fiber from a glass preform, the fiber must be surrounded by an outer layer or cladding which serves to retain the mechanical properties of the fiber and to endow the clad fiber with high tensile strength which is useful for the operations involved in the fabrication of optical fiber cables. This primary cladding operation will be described hereinafter as a "coating" operation and is of two types:

either a so-called "thin" coating, the thickness of which is typically smaller than 4 or 5 microns;

or a so-called "thick" coating having a thickness which is greater than ten microns.

Whereas the advantage offered by the first type of coating (thin coating) lies in the fact that two fibers can thus be joined end to end without removing the primary cladding, the second type (thick coating) provides better protection of the fiber and makes it possible to obtain appreciable values of mechanical strength, for example between 4 and 5 $GN/m^2$.

One of the main problems encountered when forming a thick coating lies in the difficulties which arise from the need to ensure perfect centering of the fiber within its primary protective cladding since high accuracy of centering governs to a large extent the mechanical properties of the optical fiber which has thus been clad.

In fact, the problem arises because the fiber drawn from the preform undergoes a displacement during the drawing process for the reasons given below.

Although the fiber is guided towards the storage drum by means of a guide pulley placed after the devices for coating and irradiation treatment, it is found that said fiber undergoes a transverse displacement over a distance of four to five millimeters at the level of the point of extraction of the preform. These displacements are caused by inevitable irregularities of the preform.

It is therefore necessary to produce a correlative displacement of the coating device in order to ensure good centering.

Manual regulating devices are already in existence but call for continuous supervision, which is tiring, costly and not very effective.

The invention makes it possible to carry out automatic regulation of the centering operation in order to overcome the different disadvantages indicated in the foregoing.

With this objective, the method for automatic centering of an optical fiber within a protective cladding deposited in a coating operation performed by means of a device through which the fiber passes after drawing from a preform, is mainly distinguished by the fact that the position of the coating device is controlled in dependence on the position of the fiber with respect to a predetermined point of origin; optoelectronic means are employed for measuring the coordinates of the displacement of the fiber with respect to the point of origin, said coordinates being utilized by electronic and electromechanical means for establishing the position of the coating device at each instant and thus centering the fiber.

These and other features of the invention will become more readily apparent from a consideration of the following description and accompanying drawings, in which.

Figure 1:
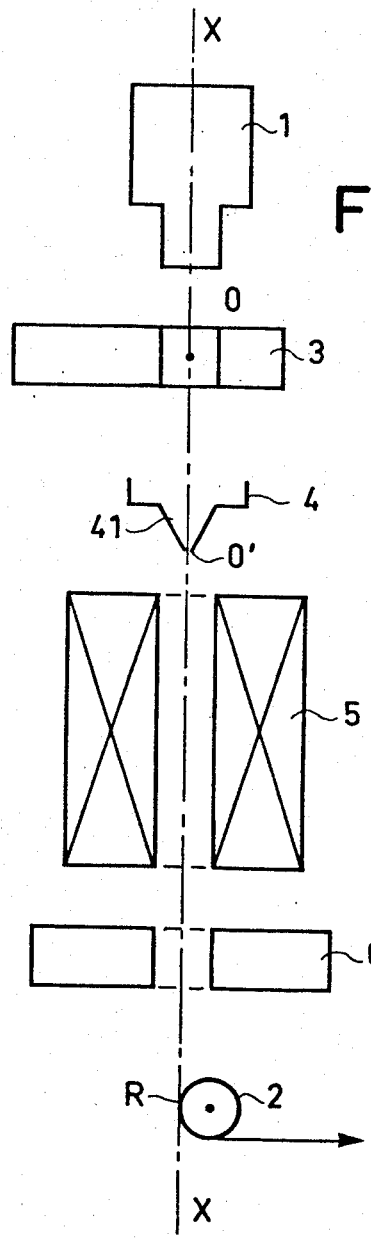
FIG. 1 is a schematic illustration of part of the equipment employed in a fiber-drawing installation.

In the installation described hereinafter by way of example and illustrated in FIG. 1, a drawing furnace 1 is placed at the top portion of the installation. The drawings do not show either the glass preform which is placed within the furnace or the fiber which is withdrawn from the furnace along an axis X—X in the line of extension of the axis of the furnace 1 and of the preform. Said fiber moves away from the axis X—X to a greater or lesser extent during the drawing process and is guided by a pulley 2 towards storage means as designated schematically by a simple arrow S.

Figure 3:
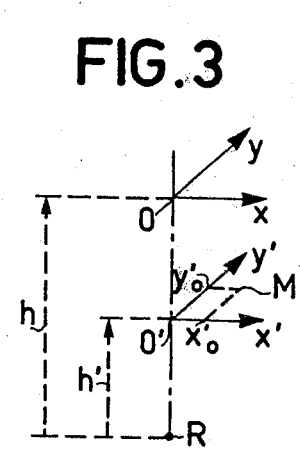
FIG. 3 is an explanatory diagram.

The pulley 2 is tangent to the axis X—X at a point R; this point is an obligatory point of transfer of the fiber between the furnace 1 and the guide pulley 2. A diameter measurement unit 3 is placed on the fiber delivery path immediately at the exit of the furnace, this unit being of a conventional type but completed by a control system which will be described hereinafter with reference to FIG. 2. The design function of the control system is to ensure that the measuring unit 3 is continuously maintained in a position such that the fiber is located on the measurement axis defined by the equipment unit which is provided in particular with a laser and with means for laser-beam scanning (performed in one plane). By way of example, the diameter measurement unit employed within the scope of the invention is in fact a unit designated by the reference M 501 A and produced by Anritsu Electric Co. Ltd, Tokyo. This unit not only gives the deviations in diameter with respect to a predetermined diameter but also the deviations of the fiber axis in x and in y with respect to the crossover point of the scanning laser beam. If O designates said crossover point, if Ox designates an axis of origin O directed in the scanning plane in the mean position of the laser pencil beam (FIG. 3) and if Oy designates a horizontal axis at right angles to Ox, the control system continuously brings back the point O onto the fiber. Thus the point O is not necessarily positioned exactly on the axis X—X.

At the exit of the measuring unit 3 on the axis X—X, there is placed a coating vessel 4 provided with a coating die 41, the frusto-conical lower end of which should be centered on a point O' located on the straight line OR which joins the point O to the point R of contact of the fiber with the guide pulley 2. Axes O'x' and O'y' have been drawn parallel to the aforementioned axes Ox and Oy. When the fiber moves away from the point O, the measuring unit 3 undergoes a displacement and brings back its center O onto the fiber. The outlet point of the die is then located at the point M having coordinates $x'_o$ and $y'_o$ in the plane Ox'y'. The precise aim of the means employed within the scope of the invention is to bring back the point M to the point O' on the straight line OR.

Figure 2:
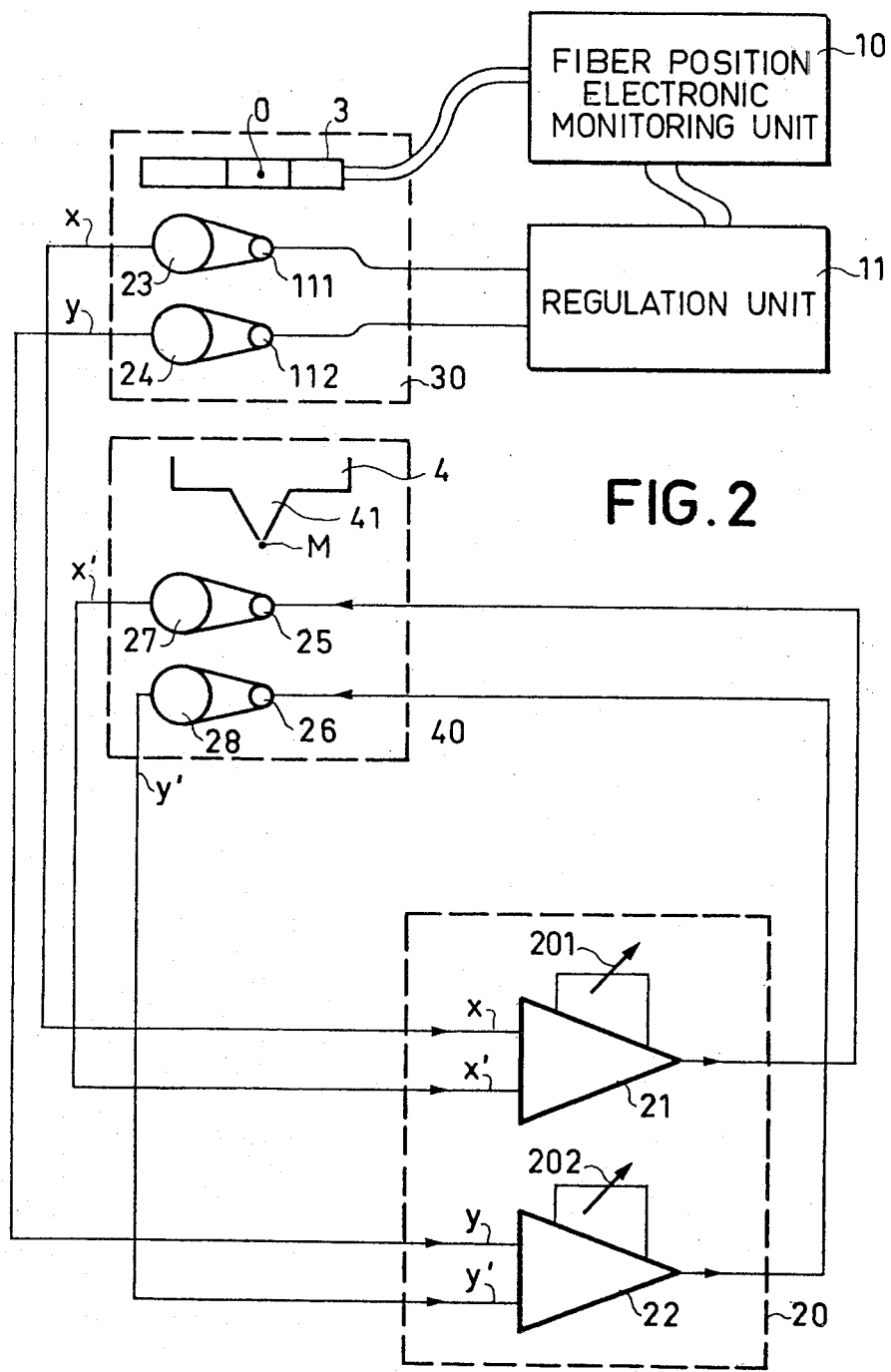
FIG. 2 is a schematic illustration of the electronic and electromechanical means employed for carrying out the method in accordance with the invention.

FIG. 2 is a schematic presentation of the means employed for maintaining on the one hand the measuring unit 3 and on the other hand the coating device 4 centered on the axis of the optical fiber at their respective levels.

The measuring unit 3 is associated with fiber position electronic monitoring unit 10. Provision is also made within the scope of the invention for regulation unit 11 which is associated with the unit 10 and in turn serves to control the motors 111 and 112 for producing the respective displacements on x and on y of the mounting-plate 30 which supports the measuring unit 3. Said mounting-plate is represented by a simple dashed outline around the unit 3 and the motors 111 and 112. Said motors are actuated in a conventional manner as a function of reference signals produced by the electronic system constituted by the unit 10 and the regulation unit 11 proper.

Moreover, the motors 111 and 112 serve to drive potentiometers 23 and 24 having the respective functions of carrying out "recopy" in x and y of the instantaneous position of the mounting-plate 30, that is to say of the crossover point of the laser-beam rays. The values of resistances corresponding to the positions of said potentiometers are inserted in the inputs of the amplifiers 21 and 22 which are located within the portion 20 of the control equipment of the coating device, i.e. the electronic and electromechanical means for ensuring the correct position of the coating device 4 at each instant. These means comprise:

the operational amplifiers 21 and 22 already mentioned;

motors 25 and 26 for producing the displacement of a mounting-plate 40 which supports the coating device and is also provided with manual regulating means;

potentiometers 27 and 28 for recopy of the coordinates x' and y' of the output point M of the coating die 41.

The resistors of the potentiometers 27 and 28 are inserted in the x' and y' inputs respectively of the amplifiers 21 and 22 which are of the differential type. Moreover, each amplifier comprises within a negative-feedback loop a potentiometer 201 or 202 which, as the case may be, serves to correct either systematic or static errors of the device. These errors are detected by employing a visual display device 6 placed on the path of the optical fiber as shown for example in FIG. 1, at the output of the heat treatment furnace 5 and at a point located upstream of the guide pulley 2. A visual display device of this type is descried in an article by H. M. Presby entitled "Geometrical Uniformity of Plastic Coating on Optical Fibres" and published in "The Bell System Technical Journal" vol. 55 No. 10, December 1976, pages 1525–1538. As described in this article, the primary cladding of optical fibers is controlled by observation of the diffraction patterns of a laser beam which is directed onto the fiber. However, it is possible to correct the systematic errors of the control loop by carrying out a manual preset adjustment described hereinafter.

The automatic centering process is put into operation as follows:

It is known that, by virtue of its own control system monitoring (unit 10, regulation unit 11 and motors 111 and 112), the measuring unit 3 is automatically located on the optical fiber which is therefore centered at O and each instant.

At the outset, however, the exit point of the coating die 41 is located at a point M having coordinates $x'_o$ and $y'_o$ in the plane $O'x'y'$ instead of being at the point $O'$ which is assumed to be placed on the straight line segment OR. When the fiber is observed by means of the visual display device 6, it is found under these conditions that the length of fiber which is being coated is not centered within its cladding.

The potentiometers 201 and 202 are accordingly actuated so as to restore the point M to the point O' or in other words to bring back the coating device to the most favorable point. The result is obtained when two symmetrical diffraction patterns are observed in the visual display device 6. Should it be desired to carry out a simple manual preset adjustment, it is possible in this case to stretch a wire which serves to materialize the straight line segment OR. The measuring unit 3 is automatically centered on this wire. The potentiometers 201 and 202 are then actuated until the discharge orifice of the die 4 is centered on the wire.

During the remainder of the drawing operation, the system for controlling the position of the coating device 4 produces action in such a manner as to ensure the following relations on the one hand between x and y, namely the coordinates of the deviation of the fiber with respect to the point O which is the center of measurement of the unit 3 and, on the other hand x', y', namely the coordinates of the deviation of the fiber with respect to the point M which coincides with the point O' located on the straight line segment OR:

$$x'/x = y'/y = h'/h$$

where h and h' (FIG. 3) represent the lengths of the straight-line segments OR and O'R. This relation results from the geometry of the drawing installation.

The device for carrying out the method of automatic centering in accordance with the invention comprises all the means hereinabove described for measuring the coordinates of displacement of the fiber with respect to the point of origin and controlling the position of the coating device in dependence on the position of the fiber.

What is claimed is:

1. A method for automatic centering of an optical fiber within a protective cladding while drawing of said fiber is in progress, said cladding being deposited in a coating operation performed by means of a device through which the fiber passes after withdrawal from a preform, in which the position of the coating device is controlled in dependence on the position of the fiber with respect to a point of origin, wherein the point of origin is determined by first optoelectronic means for controlling the centering of the fiber within its cladding, wherein second optoelectronic means serve to measure the coordinates of the displacement of the fiber with respect to said point of origin and wherein third electronic means and electromechanical means utilize said coordinates for the purpose of displacing the coating device and thus centering the fiber.

2. A method according to claim 1, wherein the second means consist of an equipment unit for measuring the diameter of the fiber prior to coating, said measuring unit being provided with means for controlling its own position with respect to said fiber.

3. A method according to claim 2, wherein the data in x and in y relating to the displacements of the fiber with respect to the point of origin are supplied respectively by two potentiometers actuated by electric motors forming part of the means for controlling the position of the measuring unit with respect to the fiber.

4. A method according to claim 3, wherein the data in x and in y are applied respectively to the first inputs of two differential amplifiers which receive respectively on their second inputs the data in x' and in y' relating to the displacements of the coating device.

5. A device for carrying out a method according to claim 1, wherein said device comprises an equipment unit for measuring the diameter of the fiber and also providing data in x and in y relating to the displacement of the fiber with respect to a position of origin, and an equipment unit for controlling the centering of the fiber within its cladding so as to permit determination of the position of origin.

* * * * *